June 27, 1939.   F. W. KATELEY   2,164,015
BRAKE SHOE ASSEMBLY
Filed Sept. 25, 1937
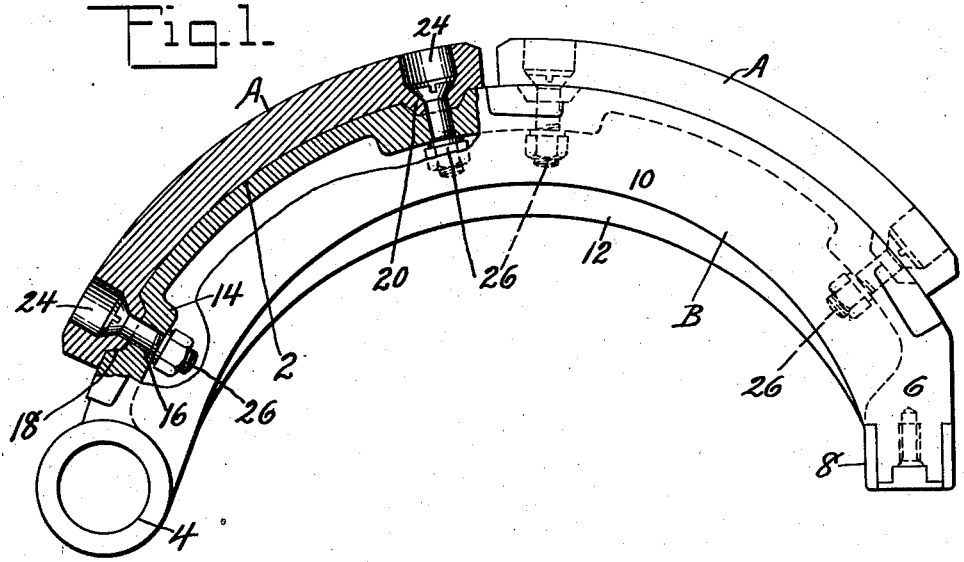
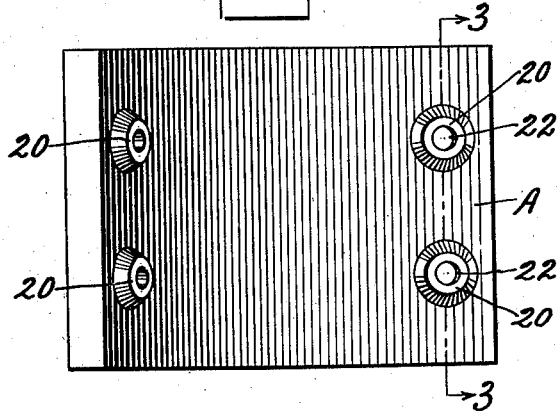
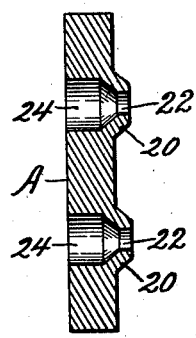
INVENTOR
Francis W. Kateley
BY
Donald U. Rich
ATTORNEY Patented June 27, 1939

2,164,015

UNITED STATES PATENT OFFICE 2,164,015

BRAKE SHOE ASSEMBLY

Francis W. Kateley, Upper Darby, Pa., assignor to The J. G. Brill Company, Philadelphia, Pa., a corporation of Pennsylvania Application September 25, 1937, Serial No. 165,754

4 Claims. (Cl. 188—234)

This invention relates to improvements in brake shoe assemblies wherein friction material is secured to a brake shoe carrier.

In the past brake shoe assemblies of the general type, wherein frictional material is secured to a carrier, have been made either with a flat surface carrier or a carrier in which grooves were cut and machined completely across the surface. With the former of these constructions insufficient friction material was left between the countersunk securing means and the carrier and the latter construction required expensive machining operations upon the carrier and in most cases some grinding or fitting of the preformed friction material in order to obtain a correct fit.

It is an object, therefore, of the present invention to provide a carrier and mating shoe which are formed with circular recesses and projections in order that the shoe may be properly positioned, and resist the braking forces.

A further object of the invention is the provision of a carrier and mating shoe in which circular recesses and projections are provided through which securing means may extend and be countersunk in the shoe without weakening the shoe at its points of attachment to the carrier.

These and other objects of the invention will be apparent to persons skilled in the art from a study of the following description and accompanying drawing, in which:

Figure 1 is an elevational view of the brake shoe assembly with substantially one-half being shown in section in order to clearly disclose the manner of assembly;

Fig. 2 is a plan view looking toward the carrier engaging surface of the brake shoe; and Fig. 3 is a sectional view taken substantially on line 3—3 of Fig. 2.

Referring now to the drawing in detail, it will be seen that the assembly consists of a pair of brake shoes A mounted upon a suitably formed carrier B. The carrier in the present instance is of the type used on motor vehicles and is provided with a shoe engaging surface 2 merging at one end into pivot mounting 4 and at the other end into a solid end 6 to which a hardened member 8 is attached in order to receive the wear incident to operation of the brake cam (not shown). The carrier may have any desired cross-section but for illustrative purposes it has been shown as of general channel cross-section with the shoe engaging surface or web braced by side flanges 10 and a center flange 12.

The shoe engaging surface of the carrier is thickened at desired points 14 and these thickened portions are drilled as at 16 and then the conical recesses 18 are formed therein by means of a countersink or other tool.

The brake shoe A is in the present instance a cylindrical segment formed from a homogeneous material conforming to the contour of the carrier and is formed on its inner surface with a plurality of integral conical projections 20 also of the same material through which holes 22 may be drilled and later countersunk as at 24 in order that securing means 26 may be inserted substantially on the axis of the conical projections and recesses to securely clamp the shoe to the carrier. In the present instance the securing means is shown as screw bolts with the heads having a taper substantially equal to the taper of the conical recess formed in the carrier, thus insuring a comparatively large and uniform area of the brake shoe friction material between the head and recess throughout the life of the shoe.

It will be obvious that with the shoe and carrier constructed as shown and described any braking forces absorbed by the homogeneous shoe will be transmitted to the carrier directly through the friction material between the securing means and the recess, thus relieving the securing means of substantially all shear forces, while the use of the conical projections and recesses will insure the proper and rapid positioning of the shoe upon the carrier during assembly.

While the device has been described more or less in detail, it is obvious that various modifications and rearrangements of parts will be apparent to persons skilled in the art and all such rearrangements and modifications are contemplated as fall within the scope of the following claims.

What is claimed is:

1. A brake shoe assembly comprising, a homogeneous brake shoe formed as a segment of a cylinder having a substantially smooth wheel engaging surface and a carrier engaging surface substantially parallel thereto, a plurality of countersinking recesses in said wheel engaging surface, substantially conical lugs formed integral with and projecting from the carrier engaging surface and each being formed of the same material as the shoe and having its axis substantially in alignment with the axis of a countersinking recess, a brake shoe carrier having its shoe receiving surface curved substantially concentric with the brake shoe surfaces, conical recesses in the brake shoe carrier adapted to receive the conical lugs on the brake shoe for transfer of braking forces from the shoe to the carrier, and securing means retaining said shoe lugs in engagement with the carrier recesses.

2. A brake shoe assembly comprising, a plurality of homogeneous brake shoes each formed as a segment of a cylinder having a wheel engaging surface and a carrier engaging surface, a carrier for said brake shoes, conical recesses formed in the carrier, a plurality of conical projections formed integral with each shoe, each projection being formed of the same material as the shoe and extending from the carrier engaging surface into a recess to prevent shifting of the brake shoes, and securing means secured in the shoe and extending through the projections and recesses to retain the shoes in position.

3. A brake shoe assembly comprising, a homogeneous brake shoe formed with a curved wheel engaging surface and a carrier engaging surface, a carrier for said shoe, a plurality of circular recesses formed in the carrier, a plurality of corresponding circular projections formed integral with the carrier engaging surface and each extending therefrom into a recess to prevent shifting of the shoe, said projections being formed of the same material as the brake shoe, and securing means retaining said shoes in position upon the carrier.

4. A brake shoe assembly comprising, a homogeneous brake shoe formed with a curved wheel engaging surface and a carrier engaging surface, a carrier for said shoe, said carrier being formed with spaced thickened portions having conical recesses therein, a plurality of complemental conical lugs formed integral with the carrier engaging surface and of the same material as the brake shoe and each extending therefrom into a recess, and securing means extending through the lugs and recesses to retain the brake shoe in position.

FRANCIS W. KATELEY.